Sept. 3, 1929.  C. P. KLEIN  1,726,988
QUICK LIFT FOR AUTOMOBILES
Filed Aug. 6, 1926
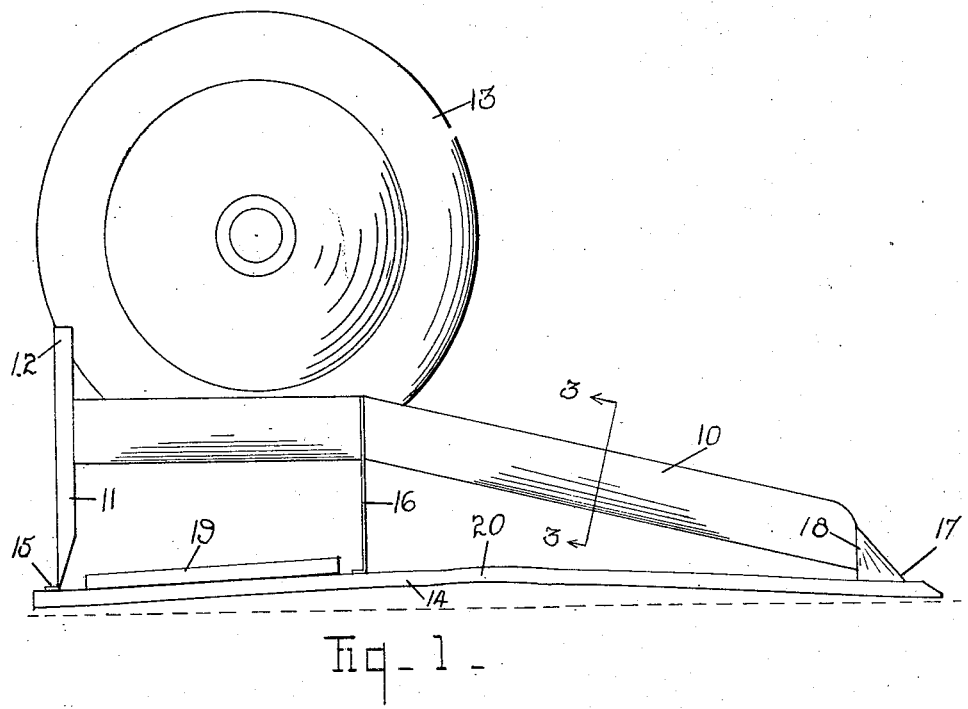
Fig-1-
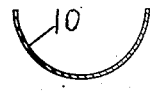
Fig-3-
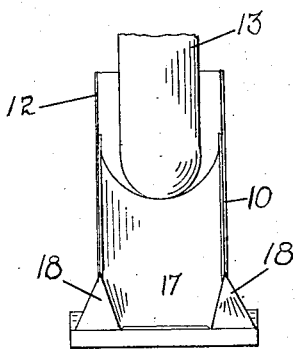
Fig-2-
Inventor
Carl P. Klein
By Owen + Owen,
Attorneys.

Patented Sept. 3, 1929.

1,726,988

UNITED STATES PATENT OFFICE.

CARL P. KLEIN, OF BELLEVUE, OHIO, ASSIGNOR TO THE KLEIN STRUCTURAL STEEL COMPANY, OF BELLEVUE, OHIO, A CORPORATION.

QUICK LIFT FOR AUTOMOBILES.

Application filed August 6, 1926. Serial No. 127,574.

My invention relates to quick lifts for automobiles, that is, to inclined planes up which the wheels of an automobile may be run in order to elevate one end of the automobile sufficiently for repair work and for other purposes. Such devices are intended for use in pairs, and are arranged parallel with each other, so that a pair of wheels will be raised simultaneously; but as the two devices are precisely alike, only one will be described.

In the accompanying drawings forming a part of this specification, Figure 1 is a side elevation of one embodiment of my invention; Fig. 2 is an end elevation looking from the right end of Fig. 1; Fig. 3 is a cross-section on the line 3—3 of Fig. 1.

In the embodiment of my invention disclosed in the drawings, a trough 10 is provided, up which a wheel of an automobile may be moved. Trough 10 comprises a sheet metal strip bent substantially to semi-circular form. One end of the trough is supported by a leg 11, which extends upward at 12 above the trough in order to form a stop for a wheel 13 of a vehicle.

The trough is attached to a base 14, which may comprise a plank. Leg 11 is shown with an out turned flange 15, which may be attached to the base. At a distance from the leg 11 substantially greater than half of the diameter of any wheel which it is intended to accommodate, there is another leg 16 which supports this portion of the trough on a substantial level with the part supported by leg 11. From support 16 the trough slants down to end 17 which rests upon base 20.

End 17 is somewhat flattened where it rests upon the base, and the corners 18 of the trough are turned downward and outward until they rest squarely upon the base. Turning the corners 18 in this manner accomplishes two purposes. In the first place, it assists in rigidly supporting the end of the trugh so that it does not tilt when struck by a wheel, and, in the second place, it provides rounded surfaces against which the wheel strikes, even if the wheel does not reach the trough in exact alignment with the center thereof.

A tool pan 19 may be placed upon the base between supports 11 and 16. Preferably, the base is bent upward at the middle, as shown at 20, so that it rests upon its two ends. When a structure of this kind is attached to a flat base plate, it is likely to slide over a floor, especially when the floor is covered with grease, when the apparatus is subjected to the push of an automobile wheel riding up thereon. When the base plate is bent in the manner disclosed, so that only its ends rest upon the floor, it does not slide upon the floor, but remains wherever it is positioned.

It will be noted that the form of the trough enables the use of comparatively light sheet metal while still making the trough strong enough to support any ordinary vehicle. This enables the device to be very easily and cheaply manufactured, and makes it light to handle and handy to store when not in use, and to place in position for use. The trough may bend slightly beneath the weight of the vehicle between supports 11 and 16, but not more than is desirable to form a slight pocket which insures the wheel remaining in position thereon.

Various modifications may be made in the exact structure within the terms of the appended claims.

What I claim is:

1. In apparatus of the character described, a trough formed of sheet metal bent to substantially semi-circular form in cross-section, said trough having an elevated, substantially horizontal portion and an inclined portion leading upward to said horizontal portion, a base plate beneath the trough, and supports at each end of the horizontal portion supporting the same from the base plate, the lower end of the inclined portion having its corners bent outward and downward to rest upon the base plate, the base plate being bent upward at its middle portion so as to rest upon a horizontal surface at its ends only.

2. In apparatus of the character described, an inclined trough up which a wheel of a vehicle may run to elevate the wheel, said trough comprising a sheet of metal bent to substantially semi-circular shape in cross section, the upper corners of the trough at the lower end being bent outward and downward until they are on the level with the bottom of the trough at that end.

In testimony whereof, I have hereunto signed my name to this specification.

CARL P. KLEIN.